UNITED STATES PATENT OFFICE.

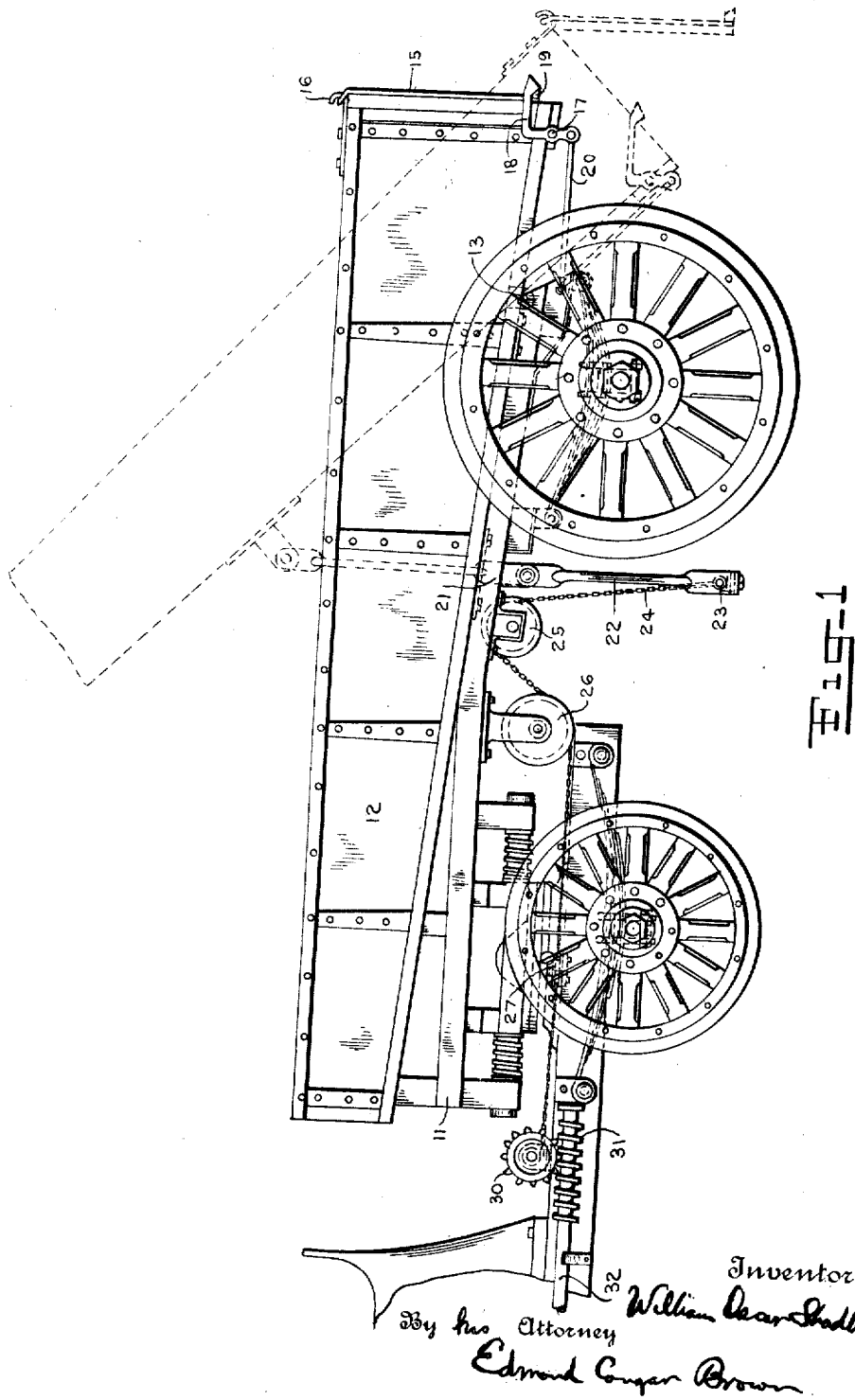

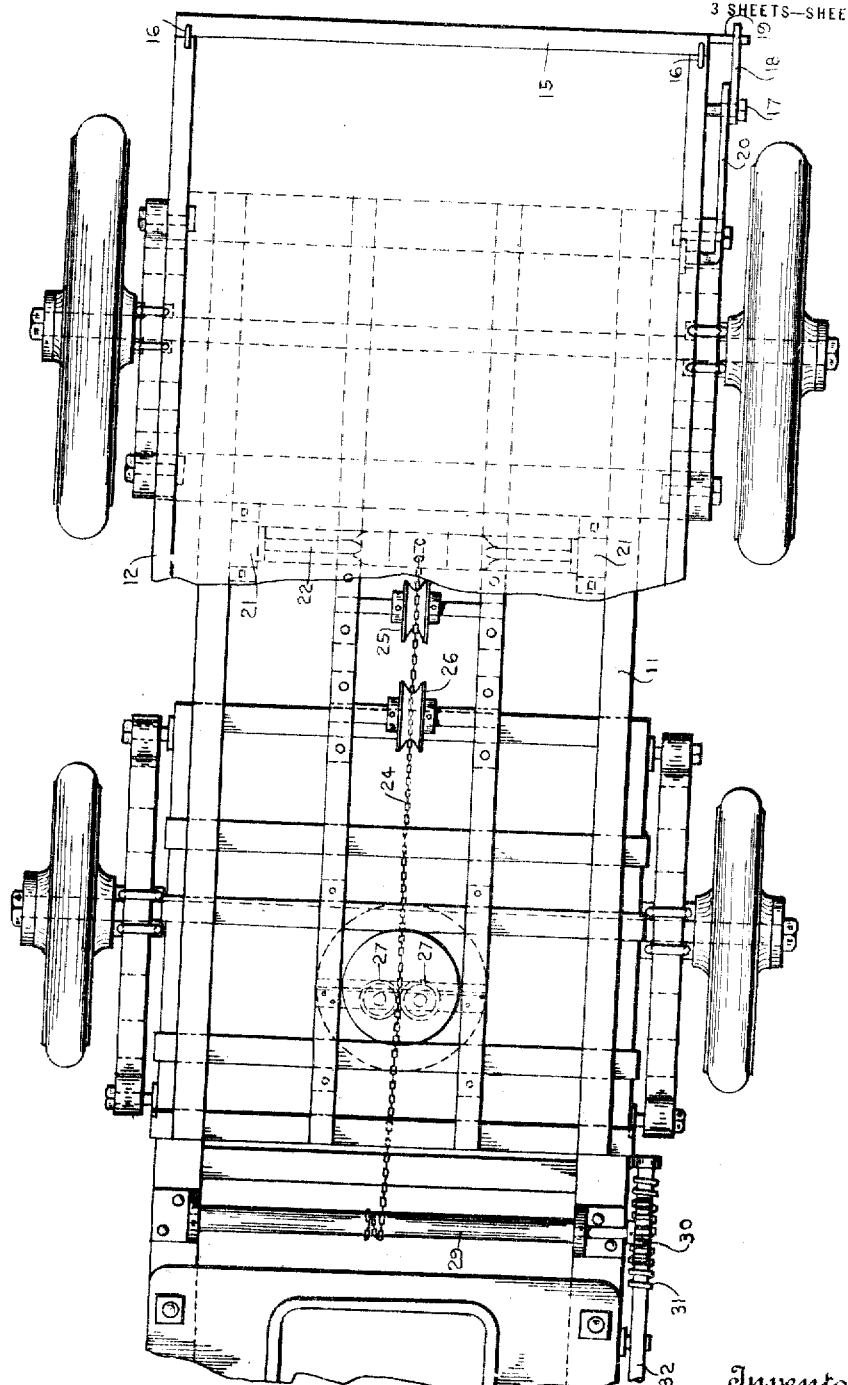

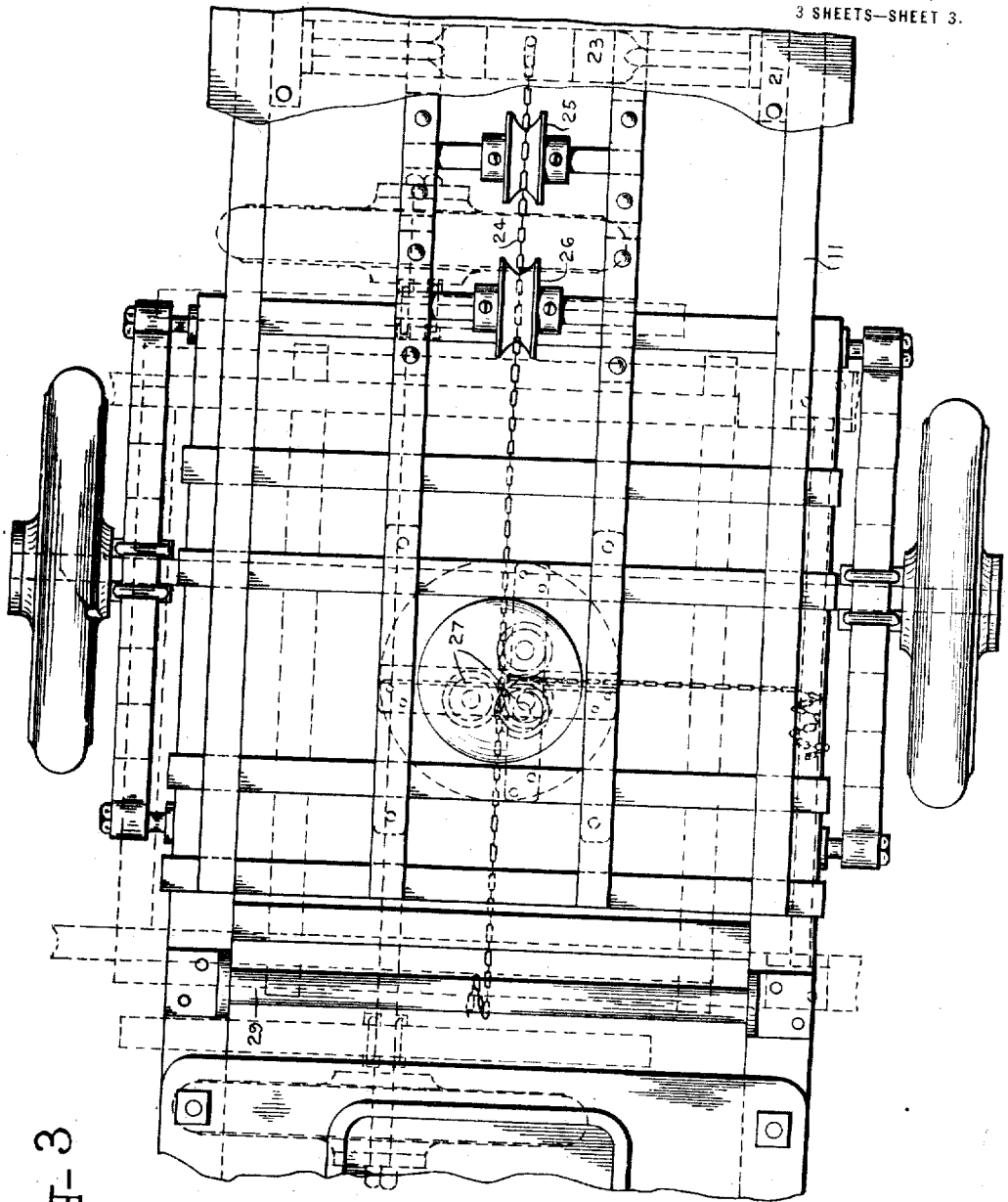

WILLIAM OSCAR SHADBOLT, OF NEW YORK, N. Y.

TRUCK.

1,193,932. Specification of Letters Patent. Patented Aug. 8, 1916.

Application filed March 8, 1916. Serial No. 82,872.

*To all whom it may concern:*

Be it known that I, WILLIAM OSCAR SHADBOLT, a citizen of the United States, and a resident of the borough of Brooklyn, in the city and State of New York, have invented certain new and useful Improvements in Trucks, of which the following is a specification.

My invention relates to dumping trucks, and has for one of its principal objects to provide a truck in which the body portion is adapted to be elevated to dump the contents at the rear, the mechanism raising said body being operated from the front of the truck, and being always in operative position whichever way the front axle of the truck, or a tractor, in case the same is employed, is turned.

The invention consists in the novel construction, arrangement and combination of various devices, elements and parts, as shown in the accompanying drawings and fully described in this specification.

In the said drawings, Figure 1 is a side elevation of my improved truck, showing its dumping position in dotted lines; Fig. 2 is a plan view of the same, a portion of the floor being removed to show the lower construction; and Fig. 3 is a plan view of the front portion of my invention, on an enlarged scale, the floor being entirely removed, and the position of the various parts when the front wheels are turned out of their normal position being shown in dotted lines.

In carrying my invention into effect in the embodiment thereof which I have selected for illustration in the accompanying drawings and description in this specification, I provide a main frame 11 having a rear axle with wheels thereon, said main frame being connected with a front axle and wheels by means of a fifth wheel of suitable construction, as for instance that shown in U. S. Letters Patent No. 1,155,623, granted to me on October 5, 1915. The wheels may either belong to the wagon or be part of a tractor, the form shown in the drawings being shown in use with a tractor.

Mounted on the frame 11 is a carrying body 12, so hinged thereto at 13 that it is capable of being tilted into the position shown in Fig. 1 by the dotted lines. If desired, an automatic door may be provided at the back of the body, which, when the body is raised into the dumping position, will open and allow the contents to slide out. This device comprises a door proper 15, suspended from hooks 16. Pivoted at 17 on the under side of the movable body 12 is an L-shaped latch member 18, one end of which is adapted to engage with a laterally extending pin 19 on the door 15, and the other end of which is connected by means of a link 20 with the frame 11.

Secured to the under side of the body 12 are downwardly projecting members 21, to which are pivoted the upper ends of rods 22. The lower ends of these rods are connected together by a cross-bar 23, to which is secured one end of a chain 24. The chain 24 passes upward and over a pulley 25 mounted in the frame 11, then downwardly and forwardly and under a pulley 26, also mounted in the frame 11, then forwardly and horizontally and between two horizontal pulleys 27 mounted on the tractor, and then still forwardly and horizontally, and is wound around a drum 29, which is provided with a gear 30. This gear 30 is driven by a worm 31 of a forwardly extending shaft 32, which may be rotated either by a hand crank, or be placed in gear with the tractor motor. If a tractor motor is used, an automatic shut-off may be provided if desired, whereby the rotation of the shaft may be stopped after the requisite number of turns have been made.

The operation of my invention is as follows: The parts of the wagon are normally in the position shown by the full lines in Fig. 1. When in this position, the wagon may be loaded, and hauled from place to place by means of the tractor or otherwise. When it is desired to dump the load, the shaft 32 is rotated, rotating the drum 29 by means of the worm 31 and gear 30, the chain 24 is wound up, raising the cross-bar 23 and vertical rods 22, thus lifting the carrying body 12 into the position shown by the dotted lines in Fig. 1. As the body is raised, the link 20 pushes against the latch 18, raising it out of engagement with the pin 19, and allowing the door 15 to swing open by its weight. Similarly, when the wagon is lowered, the door will swing into its closed position and be engaged by the latch 18.

It often happens that it is desired to dump the contents of the truck when the front wheels or the tractor are not in their usual position. Whenever the tractor is swung to one side, as is shown in Fig. 3, the pulleys 27 will be swung more or less into the positions shown in the dotted lines in Fig. 3, the chain bearing laterally against one or the other of these pulleys according to the direction in which the tractor is turned. It will thus be obvious that in whatever position the front axle or tractor may be, the chain will always be led in an approximately forward direction from the pulley 26 to the pulleys 27, and thence to the drum 29 in a direction approximately at right angles to the axis of this drum, and that the contents of the carrying body may be dumped regardless of the angle which the tractor and truck may form with each other. The pulleys 27 are situated at such a point, forwardly of the pivotal point of the fifth wheel, that the distance between the pulley 26 and drum 29, as followed by the chain 24, will not be materially changed when the tractor is swung to one side or the other.

The advantages of my invention will be obvious from what has been above said concerning its construction and mode of operation.

Having thus described my invention, what I claim as new and desire to secure by Letters Patent is as follows:

1. In a truck, the combination with running gear, a frame, and a body pivotally secured to said frame; of means adapted to tilt said body comprising a pulley on said frame, a pair of horizontal pulleys on the front running gear, a chain operatively connected with said body and adapted to pass around said first named pulley and between said second named pulleys, and means adapted to pull said chain.

2. In a truck, the combination with running gear, a frame, and a body pivotally secured to said frame; of means adapted to tilt said body comprising a pulley on said frame, a second pulley on said frame, a pair of horizontal pulleys on the front running gear, a chain operatively connected with said body and adapted to pass around said first named pulley, around said second named pulley, and between said third named pulleys; and means adapted to pull said chain.

3. In a truck, the combination with running gear, a frame, and a body pivotally secured to said frame; of means adapted to tilt said body comprising a pulley on said frame, a pair of horizontal pulleys on the front running gear in a plane tangent to said first named pulley, a chain operatively connected with said body and adapted to pass around said first named pulley and between said second named pulleys, and means adapted to pull said chain.

4. In a truck, the combination with running gear, a frame, and a body pivotally secured to said frame; of means adapted to tilt said body comprising a pulley on said frame, a second pulley on said frame, a pair of horizontal pulleys on the front running gear in a plane tangent to said second named pulley, a chain operatively connected with said body and adapted to pass around said first named pulley, around said second named pulley, and between said third named pulleys; and means adapted to pull said chain.

5. In a truck, the combination with running gear, a frame, and a body pivotally secured to said frame; of means adapted to tilt said body comprising a pulley on said frame, a pair of horizontal pulleys on the front running gear forward of the point at which said running gear is pivoted to the frame of said truck, a chain operatively connected with said body and adapted to pass around said first named pulley and between said second named pulleys, and means adapted to pull said chain.

6. In a truck, the combination with running gear, a frame, and a body pivotally secured to said frame; of means adapted to tilt said body comprising a pulley on said frame, a second pulley on said frame, a pair of horizontal pulleys on the front running gear forward of the point at which said running gear is pivoted to the frame of said truck, a chain having one end operatively connected with said body and adapted to pass around said first named pulley, around said second named pulley, and between said third named pulleys and means adapted to pull said chain.

7. The combination with a tractor and a trailer pivotally connected together so as to be adapted to swing with relation to each other in a horizontal plane, said trailer being provided with a carrying body tiltably secured to the frame thereof; of a chain having one end secured to said carrying body and adapted to tilt the same, means located entirely on said tractor adapted to operate said chain and a pair of horizontal rollers located intermediate said tilting body and said operating means and between which said chain passes whereby said chain may be operated irrespective of the angle at which said tractor and said trailer may lie with reference to each other.

8. The combination with a tractor and a trailer pivotally connected together so as to be adapted to swing with relation to each other in a horizontal plane, said trailer being provided with a carrying body tiltably secured to the frame thereof; of a chain having one end secured to said carrying body and adapted to tilt the same, means located entirely on said tractor adapted to operate said tilting means, and a pair of horizontal rollers on said tractor and between which said chain passes whereby said chain may be operated irrespective of the angle at which said tractor and said trailer may lie with reference to each other.

In witness whereof I have hereunto signed my name this 28th day of February, 1916.

WILLIAM OSCAR SHADBOLT.

Copies of this patent may be obtained for five cents each, by addressing the "Commissioner of Patents, Washington, D. C."

having one end secured to said carrying body and adapted to tilt the same, means located entirely on said tractor adapted to operate said tilting means, and a pair of horizontal rollers on said tractor and between which said chain passes whereby said chain may be operated irrespective of the angle at which said tractor and said trailer may lie with reference to each other.

In witness whereof I have hereunto signed my name this 28th day of February, 1916.

WILLIAM OSCAR SHADBOLT.

---

Correction in Letters Patent No. 1,193,932.

It is hereby certified that in Letters Patent No. 1,193,932, granted August 8, 1916, upon the application of William Oscar Shadbolt, of New York, N. Y., for an improvement in "Trucks," an error appears in the printed specification requiring correction as follows: Page 3, line 4, claim 8, for the words "tilting means" read *chain;* and that the said Letters Patent should be read with this correction therein that the same may conform to the record of the case in the Patent Office.

Signed and sealed this 5th day of September, A. D., 1916.

[SEAL.]

F. W. H. CLAY,
*Acting Commissioner of Patents.*

Cl. 21—20.

Correction in Letters Patent No. 1,193,932.

It is hereby certified that in Letters Patent No. 1,193,932, granted August 8, 1916, upon the application of William Oscar Shadbolt, of New York, N. Y., for an improvement in "Trucks," an error appears in the printed specification requiring correction as follows: Page 3, line 4, claim 8, for the words "tilting means" read *chain;* and that the said Letters Patent should be read with this correction therein that the same may conform to the record of the case in the Patent Office.

Signed and sealed this 5th day of September, A. D., 1916.

[SEAL.]

F. W. H. CLAY,
*Acting Commissioner of Patents.*

Cl. 21—20.